(12) United States Patent
Claudi et al.

(10) Patent No.: US 7,178,997 B2
(45) Date of Patent: Feb. 20, 2007

(54) ARRANGEMENT FOR HOLDING A CAMERA BEHIND A MONOCULAR OR BINOCULAR

(75) Inventors: Volker Claudi, Lahnau (DE); Kurt Becker, Linden (DE); Frank Michel, Braunfels (DE); Peter Will, Lohra (DE)

(73) Assignee: Hensoldt AG, Wetzlar (DE)

( * ) Notice: Subject to any disclaimer, the term of this patent is extended or adjusted under 35 U.S.C. 154(b) by 0 days.

(21) Appl. No.: 10/668,279

(22) Filed: Sep. 24, 2003

(65) Prior Publication Data

US 2005/0036782 A1  Feb. 17, 2005

(30) Foreign Application Priority Data

Sep. 24, 2002 (DE) ................ 102 44 669

(51) Int. Cl.
G03B 17/00 (2006.01)
G03B 21/36 (2006.01)
G03B 23/00 (2006.01)

(52) U.S. Cl. ........................ 396/428; 396/432
(58) Field of Classification Search ............... 396/428, 396/429, 432; 348/375; 352/131; 359/399, 359/407
See application file for complete search history.

(56) References Cited

U.S. PATENT DOCUMENTS

| | | | |
|---|---|---|---|
| 2,679,197 A | | 5/1954 | De Francisco |
| 2,882,791 A | | 4/1959 | Möller et al. |
| 2,933,026 A | | 4/1960 | Winzenburg |
| 2,933,992 A | * | 4/1960 | Bushnell et al. ............ 396/432 |
| 2,937,584 A | | 5/1960 | Gesualdi |
| 2,990,759 A | * | 7/1961 | Marcosky ................... 396/324 |
| 3,055,283 A | | 9/1962 | Suzuki |
| 4,222,646 A | | 9/1980 | West |
| 4,445,766 A | | 5/1984 | Yamazaki |
| 5,930,036 A | | 7/1999 | Cluff |
| 5,963,748 A | | 10/1999 | Glasson |
| 6,019,326 A | * | 2/2000 | Baerwolf et al. ......... 248/177.1 |
| 6,330,401 B1 | | 12/2001 | Greene |
| 6,357,937 B1 | * | 3/2002 | Stratton, Jr. ................ 396/428 |
| 6,717,727 B2 | * | 4/2004 | Barziza ...................... 359/399 |
| 6,791,769 B2 | * | 9/2004 | Takeda ....................... 359/819 |
| 2001/0000300 A1 | * | 4/2001 | Haile-mariam ............... 353/30 |
| 2002/0114070 A1 | | 8/2002 | Barziza |
| 2002/0197075 A1 | * | 12/2002 | Crockett ..................... 396/429 |

FOREIGN PATENT DOCUMENTS

GB  1 594 669  8/1981

OTHER PUBLICATIONS

EPO office Action Feb. 2006 (translation attached).

* cited by examiner

Primary Examiner—Christopher Mahoney
(74) Attorney, Agent, or Firm—Walter Ottesen

(57) ABSTRACT

A holding device holds a camera rearward of an ocular of a glass such as a monocular or binocular to record an image utilizing the camera. The image is made available by the glass. This holding arrangement is usable with many cameras and binoculars or monoculars. A rapid change between the camera positioned forward of the ocular and a cleared ocular is made possible for the direct viewing by the user through the glass (binocular or monocular).

26 Claims, 2 Drawing Sheets

ARRANGEMENT FOR HOLDING A CAMERA BEHIND A MONOCULAR OR BINOCULAR

BACKGROUND OF THE INVENTION

A photo adapter offered by the Leica Company of Germany provides the possibility of connecting a miniature camera to a monocular. The monocular performs the task of a super telephoto lens for the camera. The adapter includes a complex seven lens optic. A T2 adapter with a corresponding bayonet is required in order to connect the camera to the photo adapter.

The Nikon Company of Japan also offers a camera adapter with which a camera is so connected to a monocular that photographs can be made with the camera. However, only Nikon cameras can be connected to the Nikon monocular by means of this adapter which means a limitation for the customer.

For a camera connected to the monocular, it is also disadvantageous that the user can only see the image made available by the monocular through the viewfinder of the camera. Once the camera is mounted to the monocular, several manipulations are required so that the user can again look through the monocular and therefore obtain a complete impression of the image.

Furthermore, a system is known from the Nikon Company, as also from the Vixen Company, wherein a CCD camera can be connected to a viewing monocular. A separate LCD monitor can be connected to the CCD camera by means of which the user can view the image recorded via the monocular. Furthermore, a video camera can be connected with a video cable.

German Patent 2,825,505 discloses connecting a binocular to a camera having a telephoto lens so that the viewing fields of the camera and the binocular with reference to angle orientation are coincident. A functional coupling between the binocular and the camera is not provided. The camera and the binocular are provided one next to the other so that the optic of the binocular and, in parallel, the optic of the camera each generate an image.

A combination of a camera and a binocular is known from U.S. Pat. No. 4,445,766. The focal length of the telephoto lens of the camera is so selected that everything between 10 meters and infinity is imaged sharply.

U.S. Pat. No. 2,933,026 discloses the combination of a binocular and a camera. Here, the focusing devices of camera and binocular are so mechanically coupled to each other that, with a sharp adjustment of the binocular, the camera is also correspondingly focused.

A binocular is disclosed in U.S. Pat. No. 2,882,791 which is provided with an additional photo objective for recording images.

U.S. Pat. No. 6,330,401 discloses holding a camera behind one ocular of a binocular. The free ocular is then used by the user for viewing the image obtained with the binocular. This is, however, very uncomfortable for the user and one must accept unsharp images of the camera because of the high magnification of the binocular.

SUMMARY OF THE INVENTION

It is an object of the invention to provide an arrangement with which a combination of a camera and a glass (binocular or monocular) is possible independently of the camera utilized and to also provide such an arrangement which is cost effective.

A further object of the invention is to provide an arrangement by means of which the user is given the possibility of rapidly changing between the camera mounted rearward of the ocular of the glass (binocular or monocular) and to a position wherein the user can look through the glass. The possibility of the rapid change is especially interesting for monoculars.

The arrangement according to the invention includes a camera mount, a base and an attachment device. The base can be attached to a tripod attachment element, which is configured on the glass, by means of an attachment device and the camera is held by the camera mount. In this way, an arrangement is provided which is cost effective because of its simple configuration and can be utilized independently of the camera used.

Preferably, the camera is fixedly connected to the mount with the body of the camera.

In an advantageous embodiment, a tripod base attachment element is configured in the base so that the system comprising the arrangement of the invention, glass and camera can be mounted on a tripod.

It has been shown to be especially advantageous to provide the possibility to arrange the tripod in the region of the center of gravity of the system formed by the arrangement, camera and glass. In this way, it can be ensured that the system including the camera is provided by the tripod with an especially stable support not subjected to shaking.

With the measure of making available an arrangement having a base and a camera mount for holding the camera in a configuration rearward of the ocular of a glass, an arrangement is provided wherein the camera can be pivoted away from the ocular of the glass. The base is fixed in position relative to the glass and a joint is arranged between the camera mount and the base. In this way, a rapid change can be completed between the camera, which is positioned forward of the ocular of the glass, and the ocular, which is cleared of the camera, for viewing by the user.

Once the camera is exactly positioned with reference to the ocular of the glass, then, without surrendering this base adjustment, a change is possible between the camera positioned optimally forward of the ocular of the glass and the ocular cleared of the camera, except for the angle position setting.

It has been shown to be advantageous to provide a rotational or ball joint as a joint. In a preferred embodiment, the rotational joint has at least one, preferably several detent positions. With a changeover between the detent positions and when there is a return pivoting into the original detent position, the angular position is again assumed automatically which is assigned to this detent position.

In an advantageous embodiment, a length adjustment and/or an elevation adjustment and/or a lateral adjustment is provided so that the camera can be exactly positioned relative to the ocular. Furthermore, it is possible to adapt the arrangement with reference to the particular glass, especially a monocular, via the length adjustment and elevation adjustment.

In a preferred embodiment, the camera is provided with a joint connection which can be latched. A ball joint connection has proven to be especially suitable. With this latchable ball joint connection, it is possible to very exactly adjust the objective to the camera with reference to the ocular of the glass with respect to tilt and angle positions. With the latching of the joint, this once adjusted position is retained.

With the alignment of the camera to the glass (monocular or binocular), it is possible to mount the ocular-end end surface of the objective of the camera and the objective-end end surface of the ocular of the glass parallel to each other. It is possible to adjust the objective of the camera exactly to the center of the ocular by means of the elevation adjustment and the lateral adjustment. The distance between the end surface of the ocular of the glass and the end surface of the objective of the camera are minimized by the length adjustment. Furthermore, with the length adjustment, the arrangement can be adapted to glasses having different length dimensions. Furthermore, the most different objective dimensions of camera objectives and various housing dimensions of camera housings are considered.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
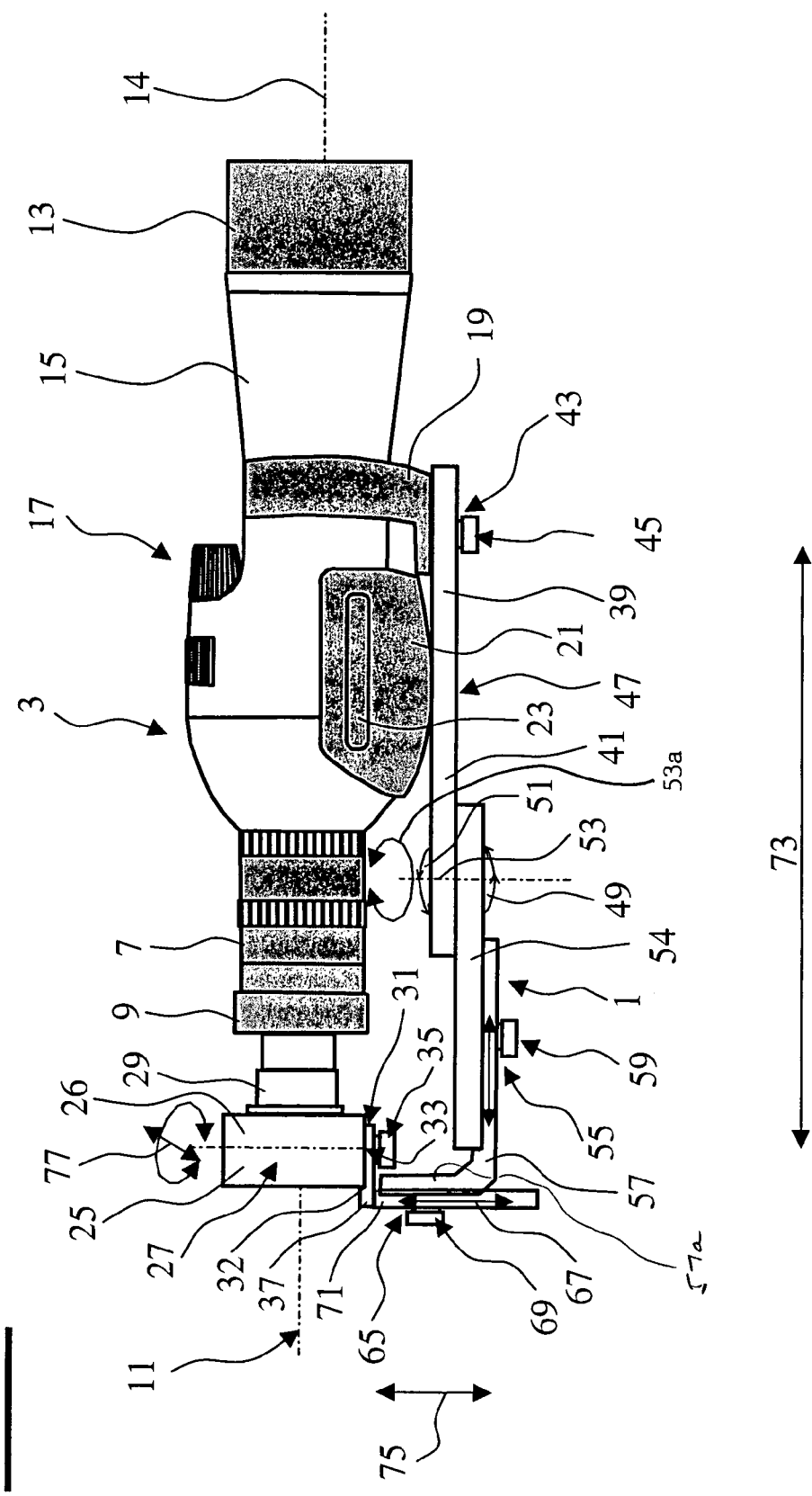
FIG. 1 shows an arrangement for connecting a camera and a monocular wherein the monocular has a linear view; and, FIG. 2 shows an arrangement for connecting a camera to a monocular wherein the monocular has an inclined view of less than 45°.

The glass 3 shown in FIG. 1 is a monocular and includes an ocular 7. an objective 13 and a housing 15. Furthermore, the monocular 3 has a focus drive 17. A grasping region 21 having grasping recesses 23 is arranged in the lower region of the monocular 3. The grasping recesses are preferably made of a rubber-like material. Furthermore, the monocular 3 includes an attachment element 19 for a stand or tripod. It is understood that the arrangement of FIG. 1 could be used also with a glass in the form of a binocular.

The optics of the objective fix an optical axis 14 of the objective 13 and an optical axis 11 of the ocular 7 is fixed by the optical elements of the ocular 7. With the monocular 3 having linear viewing, the optical axes (11, 14) of the ocular 7 and objective 13 are coincident.

A base 39 is tightly connected to the attachment element 19 for a stand or tripod via an attachment device 43. In the embodiment shown, the base 39 is configured in the form of a base plate 41. The base 39 could, however, also have another shape, for example, it could be rod-shaped or angle-shaped.

In the embodiment shown, the connection between the base plate 41 and the attachment element 19 is provided by a clamp screw. However, a tight connection between the attachment element 19 and the base plate 41 could be provided especially by an element including clamping jaws. The attachment device 43 should be so configured that it can be again loosened so that the arrangement can be separated from the monocular 3. Attachment elements 19, as a rule, have a standardized form so that a tight connection can be provided between the attachment element 19 and the base 39. In most cases, this is done by means of a one-quarter inch clamp screw 45. A cutout (not shown) is provided in the base 39 so that the clamp screw 45 can pass through the base plate 41.

Several base attachment elements 47 for a stand or tripod are configured in the base plate 41. It can be especially provided that several threaded bores are configured in the base plate 41 so that this base plate 41 can be threadably fastened to a stand or tripod by means of a screw. The position at which the base plate is mounted on the stand can be so selected that it is possible to connect the base plate 41 to the stand so that the vertical of the center of gravity of the system (comprising camera, monocular and the arrangement) passes in the vicinity of one of the base attachment elements 47, however, this vertical preferably passes directly through the particular base attachment element 47 selected.

Base plate 41 is connected to a member 54 by means of a joint 49. A rotational joint 51 is provided as joint 49 and has a rotational axis 53 perpendicular to the optical axis of the monocular 3. With this arrangement of the rotational axis 53, the camera can be pivoted laterally away from the ocular 7 as represented schematically by double arrow 53a. If the rotational axis 53 of the rotational joint 51 were parallel to the optical axis 11 of the ocular, then the camera could likewise be pivoted away from the ocular but the region behind the boundary surface of the ocular would not be entirely cleared. The boundary surface is delimited by the end edges of the ocular. It is especially advantageous when the region (which is formed by the perpendicular from the last user-end end point of the ocular 7 of the monocular 3) is cleared by pivoting away the camera.

For this reason, it is especially advantageous when the rotational axis 53 of the rotational joint 51 and the optical axis 11 of the ocular 7 conjointly define an angle. Furthermore, it is advantageous when the rotational axis 53 is disposed between the base attachment element 47 and the boundary surface of the ocular 7 of the monocular 3. In this way, it is ensured that the region rearward of the ocular is completely or almost completely cleared when the camera is pivoted.

In the embodiment shown, a rotational joint 51 is used with which, when a camera is pivoted to the right and pivoted to the left, there are three detent positions at a spacing of 45° starting from the position assumed behind the ocular. With a pivoting to the left, the free space on the right side of the monocular is held completely free so that a right handed person can actuate the focus drive 17 without hindrance.

In lieu of the rotational joint, a ball joint can be provided by means of which the camera can be pivoted away from the ocular of the monocular. It has been shown to be especially advantageous when the rotational point of the joint lies approximately on the optical axis 11 of the ocular 7.

The rotationally-movable element 54 is releasably connected to a counter element 57 to make available a length setting 55 via a clamp element 59. By loosening the clamp element 59, the counter element 57 can be displaced relative to the rotationally-movable element 54. An adjustment in length of this kind can be provided, for example, by providing a slot in the counter element 57 of the length adjustment. An axial guide can be provided so that the counter element 57 can be shifted only in the longitudinal direction relative to the element 54. For example, a U-shaped element can be provided as the rotationally-movable element 54. The counter element 57 is then guided by the two legs of the U-shaped element. In a configuration of this kind, the counter element 57 can be pressed against the base of the U-shaped element by means of a clamp element 59 whereby a fixed clamping can be achieved.

If no axial guide is provided, then the joint can be omitted and the counter element 57 of the length adjustment can be pivoted to the side by loosening the clamp element 59. In an embodiment of this kind, a separate rotationally-movable element 54 is unnecessary.

The arrangement of the rotational joint 51 and the counter element 57 of the length adjustment can, of course, be configured in the opposite sequence.

The counter element 57 is configured as an angle element. A slide 67 is releasably and fixably connected to the second leg by means of a clamp element 69. The second leg is not connected to the rotationally-movable element 54. In this type of clamp connection by means of clamp element 69, the same system can be used as in the clamp connection by means of the clamp element 59. With the slide 67, the camera, especially the objective 29 thereof, can be adjusted in elevation relative to the ocular 7 of the monocular 3.

The slide 67 includes a camera mount 31 in the form of a base plate 32. This base plate 32 is part of the slide 67 configured as angle element 37. In the embodiment shown, the thread, which is configured in most cameras in the base of the camera housing, is used in order to attach the camera housing 26 and therefore the camera 25 fixedly to the base plate 32 by means of a screw 35. If the camera 25 does not have a thread of this kind, then an attachment by means of clamping jaws can be provided on the slide 67.

In an advantageous embodiment (not shown), a ball head of a ball joint can be attached to the camera either by means of clamping or by a threaded fastener and the ball head is journalled in a ball socket. The ball socket is fixedly connected to the slide joint. This ball socket is provided with a latching mechanism which is preferably in the form of clamping jaws. By means of the latching mechanism, a setting of the angle position of the camera and therefore of the joint can be latched. In this way, it is possible to use the embodiment of the arrangement shown in FIG. 1 also for a monocular with an inclined view. However, the angle element 37 is used with a longer or correspondingly long configured slide region.

Figure 2:
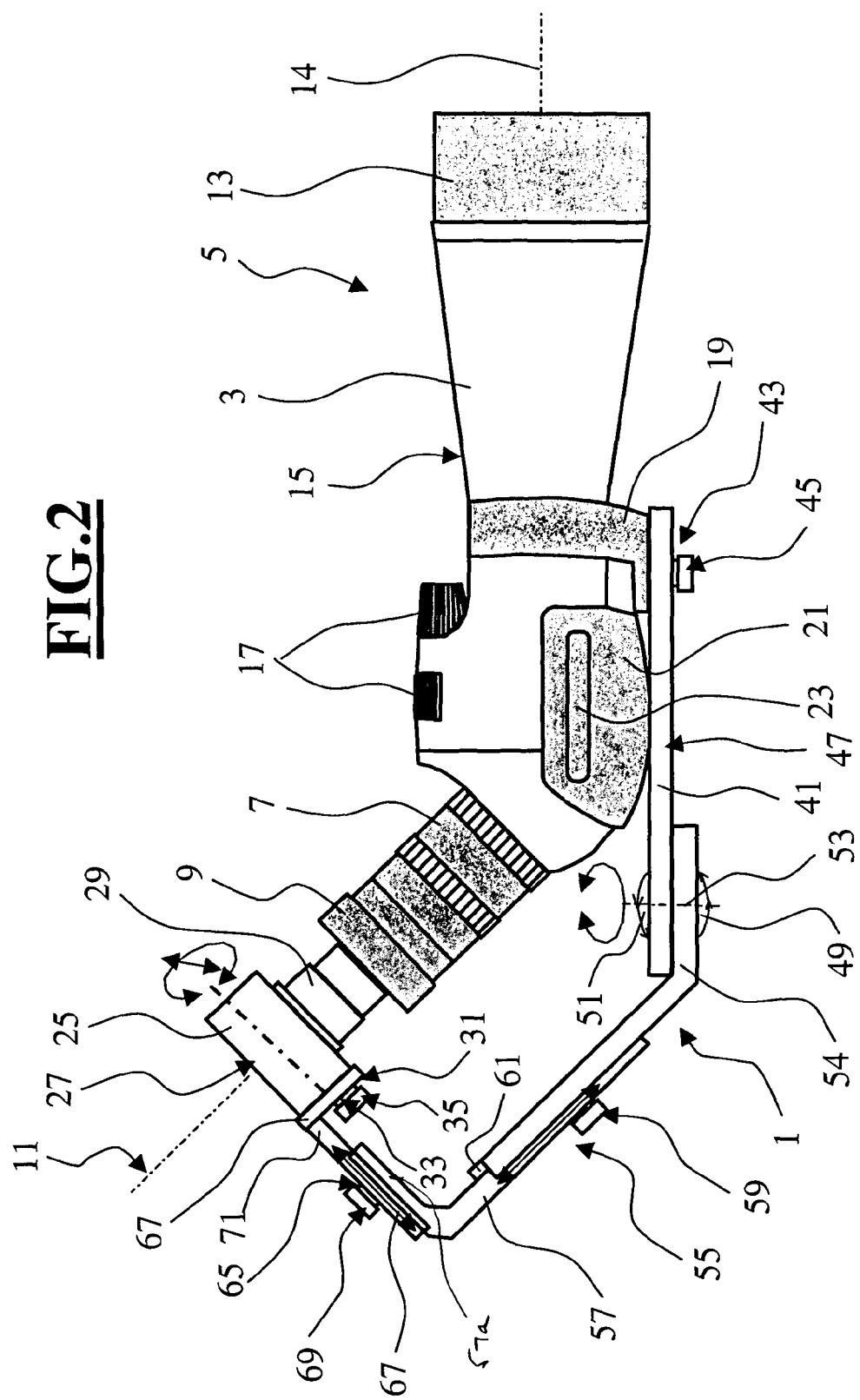

The system shown in FIG. 2 includes a camera and a monocular and differs from the system shown in FIG. 1 only in that this monocular 3 has an inclined eye piece which is here at 45°. The rotationally-movable element 54 is configured angled for adapting the arrangement 1 to this angled eye piece.

In the following, only the differences of the embodiment shown in FIG. 2 compared to FIG. 1 are discussed. Furthermore, in this embodiment, an additional stop element 61 is provided so that, when loosening the clamp element 59 before pivoting the camera 25, the camera can be moved away from the ocular 7 of the monocular 3 in the direction of the optical axis 11 of the ocular 7 before the pivot movement is carried out. For setting the original position, the counter element 57 of the length adjustment 55 is again pushed up to the stop 61 and is fixed by means of the clamp element 59. It can also be provided to make possible pulling out of the camera 25 away from the ocular of the monocular 3 by a predetermined maximum distance against a spring force. The base position is again assumed with the relaxing of the force acting from the outside. This mechanism facilitates the pivoting away from the ocular and makes possible to minimize the distance between the last lens surface of the ocular 7 and the oblective 29 of the camera 25.

In order to minimize the incidence of light between the objective and the camera, the user can use an eye shield or eye cup provided the ocular 7 is so equipped. The user can also simply use a hand to shield the connecting location between the camera objective 29 and the ocular 7 of the monocular.

If the camera 25 is positioned with respect to the monocular, then the camera focuses automatically on the image, which is generated by the monocular, insofar as a focusing is carried out via the objective. Only in rare cases is a manual refocusing needed. If no autofocus camera is used, then the focusing has to be done manually. This arrangement of the invention is suitable to an equal extent for film cameras, digital cameras and video cameras.

By selecting the magnification to which the camera is adjusted, the image section, which is imaged by the camera, can be changed. In this way, the image section, which can be recorded by the camera, can be adapted to the image section imaged by the monocular.

In digital or video cameras, this adaptation can also be made by readjusting the recorded images. The edges, which disturb the image impression, can be removed.

It is understood that the foregoing description is that of the preferred embodiments of the invention and that various changes and modifications may be made thereto without departing from the spirit and scope of the invention as defined in the appended claims.

What is claimed is:

1. An arrangement for holding a camera rearward of an ocular of a glass in the form of a monocular or a binocular, the arrangement comprising:

a mount for holding said camera rearward of said ocular of said glass;

an attachment element on said glass whereat said glass can be connected to a stand; and, a base connected to said mount and having an attachment device for attaching said base to said glass at said attachment element;

said attachment element being a first attachment element and said base having a base attachment element formed therein whereat said arrangement can be connected to a stand;

said base attachment element being at a location shifted in a direction toward said ocular away from said first attachment element so as to place said base attachment element closer to said ocular than said first attachment element;

said glass having a first center of gravity and said arrangement, said camera and said glass conjointly defining a second center of gravity at a location different from the location of said first center of gravity; and, said location of said base attachment element being selected to consider said second center of gravity to provide more stable mounting of said arrangement when mounted on said stand.

2. The arrangement of claim 1, wherein said base has a plurality of said base attachment elements formed therein whereat said arrangement can be connected to a stand; and, said base attachment elements are formed in said base so that always one of said base attachment elements is disposed in the region of said center of gravity.

3. The arrangement of claim 1, wherein said camera is connected to said base via a joint.

4. The arrangement of claim 3, wherein said joint is a rotational joint.

5. The arrangement of claim 4, wherein said rotational joint has at least one detent position.

6. The arrangement of claim 4, wherein said rotational joint has a plurality of detent positions.

7. The arrangement of claim 4, wherein said ocular defines an optical axis and said rotational joint defines a rotational axis; and, said optical axis and said rotational axis conjointly define an angle.

8. The arrangement of claim 1, wherein said camera is connected to said base via a rotational joint; and, said rotational joint lies between said base attachment element and a vertical from the end surface of said ocular.

9. The arrangement of claim 1, further comprising a length adjusting device for changing the horizontal distance between said mount and said attachment device.

10. The arrangement of claim 9, further comprising an elevation adjusting device for varying the vertical distance between said base and said mount.

11. The arrangement of claim 10, further comprising a lateral adjusting device for adjusting the position of the objective of said camera relative to said ocular.

12. The arrangement of claim 1, wherein said mount includes a latchable ball joint connection for facilitating a parallel alignment of the objective of said camera and said ocular.

13. An arrangement for holding a camera rearward of an ocular of a glass in the form of a monocular or a binocular, the arrangement comprising:
   a base attached to said glass;
   said base including a ball joint; and,
   means connected to said ball joint for pivoting said camera laterally away from said ocular.

14. An arrangement for holding a camera rearward of an ocular of a glass in the form of a monocular or a binocular, the arrangement comprising:
   a base;
   a mount for holding said camera rearward of said ocular of said glass;
   an attachment device for tightly mounting said base relative to said glass;
   said mount and said base conjointly defining an interface; and,
   a joint arranged at said interface for facilitating a pivoting of said camera laterally away from said ocular.

15. The arrangement of claim 14, wherein said joint is a rotational joint.

16. The arrangement of claim 15, wherein said rotational joint has at least one detent position.

17. The arrangement of claim 15, wherein said rotational joint has a plurality of detent positions.

18. The arrangement of claim 15, wherein said ocular defines an optical axis and said rotational joint defines a rotational axis; and, said optical axis and said rotational axis conjointly define an angle.

19. The arrangement of claim 14, further comprising a leng adjusting device for changing the horizontal distance between said mount and said attachment device.

20. The arrangement of claim 19, further comprising an elevation adjusting device for varying the vertical distance between said base and said mount.

21. The arrangement of claim 20, further comprising a lateral adjusting device for adjusting the position of the objective of said camera relative to said ocular.

22. The arrangement of claim 14, wherein said mount includes a latchable ball joint connection for facilitating a parallel alignment of the objective of said camera and said ocular.

23. An arrangement of a camera and a glass in the form of a monocular or binocular having an ocular with said ocular defining an optical axis, the arrangement comprising:
   a holder for holding said camera rearward of and in spaced relationship to said ocular; and,
   means for pivoting said holder and said camera about a point lying approximately on said optical axis so as to cause said camera to be pivoted laterally away from said ocular.

24. An arrangement of a camera and a glass in the form of a monocular or binocular having an ocular with said ocular defining an optical axis, the arrangement comprising:
   a holder for holding said camera rearward of said ocular;
   means for pivoting said holder and said camera about a rotational axis so as to cause said camera to be pivoted laterally away from said ocular; and,
   said rotational axis and said optical axis of said ocular conjointly defining an angle.

25. The arrangement of claim 24, wherein said angle is an acute angle; and, said pivoting means pivots said holder and said camera to move said camera away from behind said ocular.

26. An arrangement of a camera and a glass in the form of a monocular or binocular having an ocular with said ocular defining an optical axis, the arrangement comprising:
   a holder for holding said camera rearward of said ocular;
   means for pivoting said holder and said camera about a rotational axis so as to cause said camera to be pivoted laterally away from said ocular;
   said rotational axis and said optical axis of said ocular conjointly defining an angle; and,
   said camera and said holder being pivoted about a point which lies approximately on said optical axis of said ocular.

* * * * *